(12) United States Patent
Zeng

(10) Patent No.: US 8,740,176 B2
(45) Date of Patent: Jun. 3, 2014

(54) DRIVING AND ADJUSTING DEVICE OF PASSIVE SHUTTLE-TYPE SHUT-OFF VALVE

(75) Inventor: Xiangwei Zeng, Sichuan (CN)

(73) Assignee: Xiangwei Zeng, Sichuan (CN)

( * ) Notice: Subject to any disclaimer, the term of this patent is extended or adjusted under 35 U.S.C. 154(b) by 0 days.

(21) Appl. No.: 13/638,068

(22) PCT Filed: Apr. 1, 2011

(86) PCT No.: PCT/CN2011/000570
§ 371 (c)(1),
(2), (4) Date: Dec. 11, 2012

(87) PCT Pub. No.: WO2011/120338
PCT Pub. Date: Oct. 6, 2011

(65) Prior Publication Data
US 2013/0207011 A1    Aug. 15, 2013

(30) Foreign Application Priority Data
Apr. 1, 2010 (CN) .......................... 2010 1 0137573

(51) Int. Cl.
*F16K 1/12* (2006.01)
*F16K 31/122* (2006.01)

(52) U.S. Cl.
USPC ............................. 251/26; 137/219; 251/31

(58) Field of Classification Search
USPC .................... 137/219, 220; 251/26, 29, 31
See application file for complete search history.

(56) References Cited

U.S. PATENT DOCUMENTS

| 1,483,991 | A | * | 2/1924 | Slattery ..................... 137/219 |
| 1,841,608 | A | * | 1/1932 | Kruse ....................... 137/220 |
| 2,381,447 | A | * | 8/1945 | Hedene ..................... 137/462 |
| 2,698,717 | A | * | 1/1955 | Sisco ....................... 236/15 R |
| 3,604,679 | A | * | 9/1971 | Pennington .................. 251/26 |
| 3,854,382 | A |   | 12/1974 | Walters et al. |
| 5,119,717 | A | * | 6/1992 | Yasutome .................... 91/361 |

FOREIGN PATENT DOCUMENTS

| CN | 88200665 U | 11/1988 |
| CN | 101363574 A | 2/2009 |
| GB | 1291527 | 10/1972 |
| JP | 7332597 A | 12/1995 |
| JP | 20059569 A | 1/2005 |

* cited by examiner

*Primary Examiner* — Stephen M Hepperle
*Assistant Examiner* — Frederick D Soski
(74) *Attorney, Agent, or Firm* — The Webb Law Firm

(57) ABSTRACT

A driving and adjusting device of a passive shuttle-type shut-off valve is provided. The problems of a big valve body structure size, a non-random angle installment, a single drive mode, low stability and reliability, a high temperature and poisonous material entering into the driving and adjusting device and unadjustable on-off speed and low volume in the prior device are solved. A main body (33) is connected with an upstream pipe (1) and a downstream pipe (3). A pressure port (2) on the upstream pipe (1) is connected with the driving device. A double acting cylinder (34) is provided in a valve sleeve (21). The left and right chambers of the double acting cylinder are connected with the valve clack (24). The driving device is composed of a regulating valve, a directional valve, a check valve, a boost-insulation valve and an accumulator (18). It can select the drive mode and adjust the on-off speed and the flow volume of the valve.

5 Claims, 2 Drawing Sheets

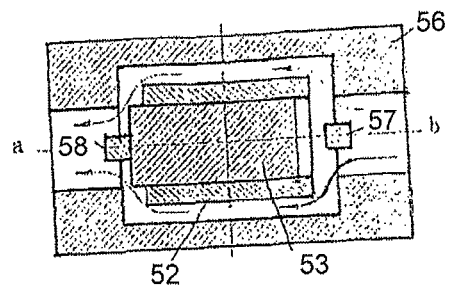
FIG. 4
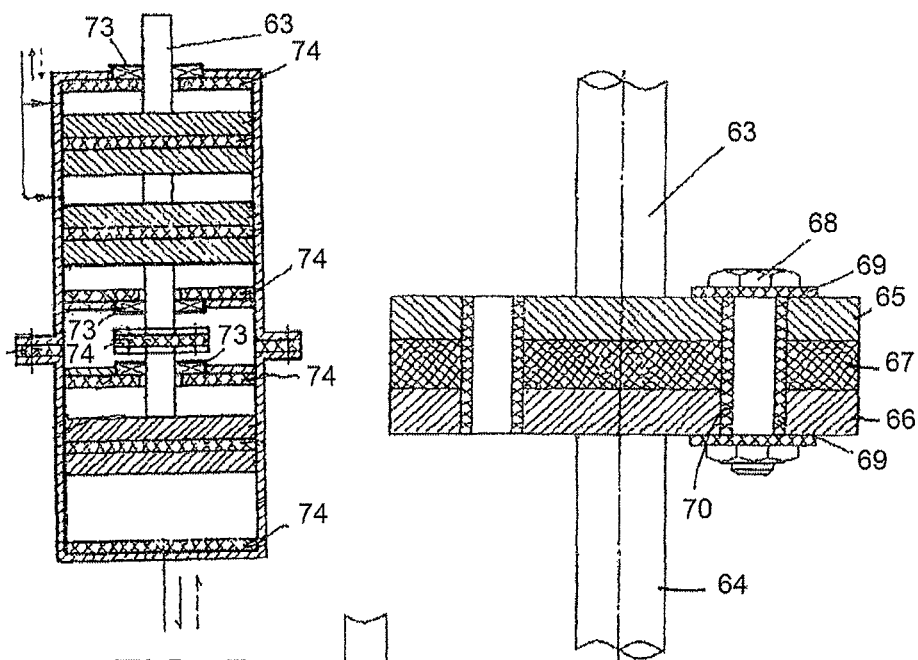
FIG. 5
FIG. 6
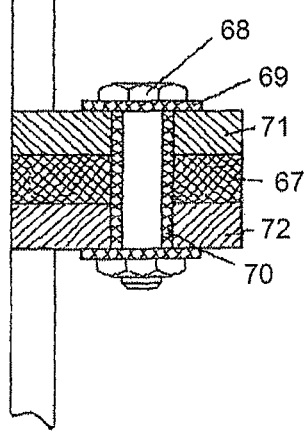
FIG. 7

DRIVING AND ADJUSTING DEVICE OF PASSIVE SHUTTLE-TYPE SHUT-OFF VALVE

TECHNICAL FIELD

The present invention relates to shut-off and opening of a fluid transport pipe and an adjusting device.

BACKGROUND ART

In the technical fields of petroleum, chemical industry, metallurgy, electricity, nuclear power or the like, the main valve of high-temperature, high-pressure and large-flow shut-off device is generally a check valve, a gate valve, a ball valve and etc., which have their respective merits but are defective in sealing, vibration, noise, erosion, seismic resistance. At the same time, due to great vertical height and complex structure, the valve body cannot be mounted at any angle and has poor economical interest due to high cost and energy consumption; also the valve body has poor reliability and increased longitudinal stacking height.

Current drive systems are mainly categorized into two groups:

1. system medium drive (i.e. passive controlled) which is simple, energy-saving but whose on-off quality is affected by fluctuation of system pressure and on-off time cannot be adjusted;

2. peripherals power source drive which can not only be normally activated and deactivated and also shut off in emergency, whose on-off time is adjustable without being affected by fluctuation of system pressure, and which has relative higher costs due to addition of related devices.

The drive system of current valve on-off adjusting device is dull and has poor drive stability and reliability, and on-off speed and flow rate of the valve cannot be adjusted.

SUMMARY OF THE INVENTION

The object of the present invention is to provide a driving and adjusting device of a passive shuttle-type shut-off valve without altering the axial and radial sizes of the main valve body, the device having a plurality of drive systems, being stable and reliable in driving, and the on-off speed of the valve, flow rate and drive means of the device being allowed to be adjusted.

A further object of the present invention is to ensure stable pressure of the system, to decrease volume, and to prevent high-temperature and poisonous substances of the system from entering into the adjusting valve line of the driving and adjusting device.

The present invention is achieved in such a manner:

The present invention provides a valve on-off adjusting device. The left end of a valve body 33 is connected with an upstream pipe 1, and the right end is connected with a downstream pipe 3. In an inner chamber of the valve body, a valve sleeve 21 is in axial sliding engagement with a valve shaft 31 coaxial with the sleeve. The left end of the valve shaft 31 is connected with a valve flap 24, and a piston 25 is disposed between the right end of the shaft and a double acting cylinder. The piston 25 is arranged within the double acting cylinder 34 in the valve sleeve 21. A double acting cylinder cap 27 is provided at the right end of the valve sleeve, and flow channels are provide at periphery of the sleeve. The left side of the valve flap 24 is in sealing engagement with a valve seat 29, and the right side thereof and the double acting cylinder is provided with a spring 23 therebetween. A left chamber 35 of the double acting cylinder is connected with ends (ports, end ports) a of first and second three-position four-way valves 11, 12 via a first line 47 or a first shuttle-type boosting insulation valve 61 in parallel connection with the first line, a first bi-directional adjusting valve 7, and a second line 54. A right chamber 36 is connected with ends b of the first and second three-position four-way valves via a third line 48 or a second shuttle-type boosting insulation valve 60 in parallel connection with the third line 48, a second bi-directional adjusting valve 6 and a fourth line 46. Ends p of the first and second three-position four-way valves are connected with end a of a three-way diverter adjusting valve 8 via a fifth line 44. Ends t of the first and second three-position four-way valves are connected with a return tank 5 via a sixth line 49. An end c of the three-way diverter adjusting valve 8 is connected with an energy accumulator 18 via a seventh line 43 and a first check valve 17. The end b of the three-way diverter adjusting valve 8 is connected with a pressure port 2 of the upstream pipe 1 via a second check valve 10, an eighth line 41 or a third shuttle-type boosting insulation valve 62 connected parallel therewith. The energy accumulator 18 is connected with the return tank 5 via a ninth line 42, a third check valve 16, a pump 19, and a tenth line 40. The energy accumulator 18 is connected to a pressure relief groove 4 via a pressure relief valve 15 and an eleventh line 50.

The first and second three-position four-way valves are a manually operated valves or electromagnetic valves. The first, second and third check valves are passive shuttle-type check valves. The three-way diverter adjusting valve 8 is a passive shuttle-type three-way diverter adjusting valve. The opposite axial ends of a shuttle sleeve 52 of the three-way diverter adjusting valve 8 are provided with adjusting screws 51 which come into contact with either side of a shuttle core 53 via an adjuster fixedly connected to the screws. The ends b, c are respectively in communication with two medium main channels, the end a is in communication with a by-pass channel and is provided with a shuttle-type check valve 59. The shuttle core 53 closes the ends b and c respectively at a limit position and is connected to a line 44. The first and second bi-directional adjusting valves are passive shuttle-type bi-directional adjusting valves.

The first and second three-position four-way valves are handled electromagnetic valves.

The first line 47, the third line 48 and the eighth line 41 are provided with a first handled electromagnetic valve a, whose two ends are respectively connected with a multi-piston cavity and a mono-piston cavity of a shuttle-type boosting insulation valve by means of second and third handled electromagnetic valves b, c. The piston in the multi-piston cavity is coaxial with that in the mono-piston cavity, and heat insulating layers are disposed between the pistons and the two cavities. Capacity of the mono-piston cavity is greater than that of the left chamber or right chamber of the double acting cylinder 34.

One of the second handled electromagnetic valves b is connected with the mono-piston cavity and the second check valve 10, and the other two handled electromagnetic valves b are respectively connected with the first and second bi-directional adjusting valves and the multi-piston cavity.

The present invention provides an axial-flow, symmetrical and balanced shuttle-type structured main valve, wherein a main valve flap drive cylinder is placed in a gradational channel in an axial cross flow without altering axial structural length and radial diameter of the main valve, and removal of the longitudinal stacking height due to arrangement of a drive device can significantly decrease size of the form and weight of the structure and is more simple and reliable. The present application provides three novel drive systems: 1. passive controlled drive; 2. outer power source drive; 3. compatible drive of the passive controlled drive and the peripherals power source drive. The chief drive control elements are the latest passive controlled shuttle-type elements. The drive system of the present invention exhibits the following advantages:

1. compatibleness, compensation and serving as backup for each other to provide protection can be achieved in the case that the outer power source and the system medium are entirely identical.

① in passive controlled driving state, the energy accumulator 18 maintains stable operation pressure and compensates the drive system with energy in time when the main valve body 33 is on or off or the system pressure fluctuates so as to make the drive system stable and reliable.

② in outer power source driving state, the pump 19 and the energy accumulator 18 are the main energy supplier and the pressure port 2 of the main pipe is closed.

③ energy can be supplied to the drive system by the pressure port 2 of the system main pipe when the outer power source malfunctions.

2. The manual three-way diverter adjusting valve 8 is to lock selection of a drive power source to prevent mixing of two different medium energies, or to prevent bi-directional alternative vibration caused by minor pressure difference of the same mediums so as to ensure consistence and stability in energy supply.

3. The three-position four-way valves 11, 12 are connected in parallel to ensure exclusive use of the system energy and the outer energy and to function as backup for each other in emergency.

4. The manual handles 13, 14 are used to lock the on-off position of the main valve body when two power sources are used to drive and also function as backup for each other in emergency.

The above three drive means can be selected at random and can work without interference with each other when the drive mediums are different, thereby providing stable and reliable drive; and a shuttle-type adjusting valve is selectively used for cooperation so as to make on-off speed of the valve and the flow rate of the main valve adjustable.

5. The pressure is stable and necessary pressure valve is present when the system pressure source is used to drive, thereby increasing driving force and decreasing diameter of the piston 25 to achieve the purpose of reducing volume and weight, ensuring to seal the high-temperature of the system medium and seal poisonous and hazardous material in the system against contact with the drive control device and medium, ensuring universality, conventionality, normal-temperature, standardization and systemization of the drive system so as to reduce cost and improve safety and reliability.

BRIEF DESCRIPTION OF THE DRAWINGS

FIG. 4 is a schematic view showing the structure of the passive shuttle-type bi-directional adjusting valve according to the present invention.

In FIGS. 2, 3 and 4, the numeral sign 53 represents a shuttle core; 52 represents a shuttle sleeve; 54 represents a bypass; 55 represents a bypass; 56 represents a housing; 57, 58 represent adjusters; a, b, c represent end ports.

FIG. 5 is a structural view of a shuttle-type boosting insulation valve.

FIG. 6 is a view showing heat insulation connection between the upper and lower piston rods of the shuttle-type boosting insulation valve.

FIG. 7 is a view showing the connection between the multi-piston cavity and mono-piston cavity of the shuttle-type boosting insulation valve.

DESCRIPTION OF THE EMBODIMENTS

Embodiment 1

Figure 1:
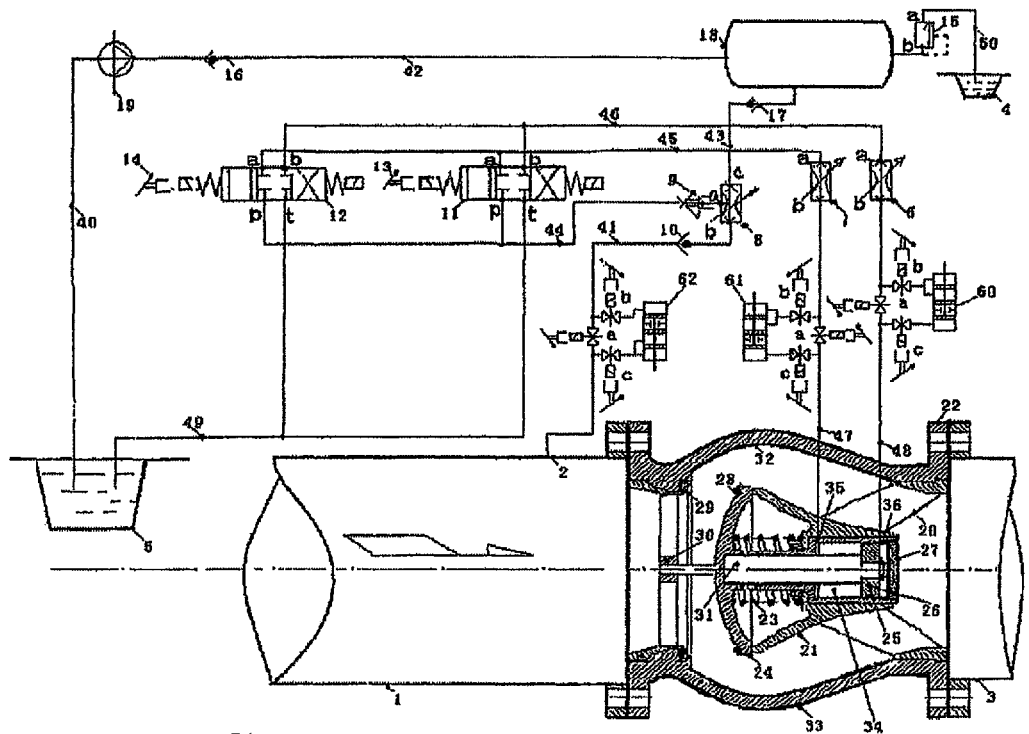
FIG. 1 is a system view of the passive shuttle-type on-off adjusting device according to the present invention.
Figure 2:
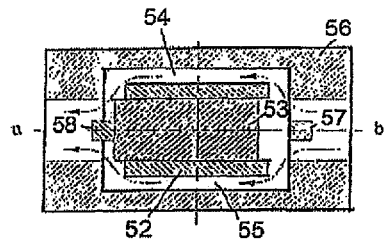
FIG. 2 is a schematic view showing the structure of the passive shuttle-type check valve according to the present invention.

FIG. 1 shows a passive shuttle-type on-off adjusting device of the present invention, wherein a main valve body 33 is connected with an upstream pipe 1 and a downstream pipe 3; the upstream pipe 1 has a driving force pressure port 2 therein to provide power source to a drive device, so as to achieve on-off and adjustment of the main valve body 33. The main valve body 33 is configured as a shuttle-type check valve equipped with a drive cylinder 34. All the components of the main valve body are symmetrical and balanced with respect to an axis, in which a sealing pair consisting of a valve flap 24 and a valve seat 29 includes an end face hard seal, or sealing engagement with the end face being embedded with a seal ring and etc., the sealing requirements are similar to those of the shuttle-type check valve.

The valve flap 24 of the main valve body 33 is mainly supported by a single point support formed by engagement between a valve sleeve 21 and a valve shaft 31. When less on-off resistance is required and the valve flap is large in weight, a double support may be needed by adding a front support 30 whose structure is similar to that of the shuttle-type check valve with little resistance.

The drive cylinder 34 of the main valve body 33 is a double acting cylinder. A piston 26 is sealed by soft sealing of a seal ring 25 or precision sliding sealing, or by connecting between the left chamber 35 and the shuttle-type bi-directional adjusting valve 7; the right chamber 36 is connected with a shuttle-type bi-directional adjusting valve 6 to provide energy for drive, thereby achieving opening, closing and adjusting of the main valve body 33.

The main valve body 33 is normal close in a free state.

The shuttle-type main valve body 33 is equipped with a double acting drive cylinder 34, and is selectively powered via a shuttle-type three way diverter adjusting valve 8 (locked by a manual adjusting screw 51) by the pressure port 2 of the main pipe 1 or by an outer power source consisting of a outer power supply pump and a compressor 19 through an energy accumulator 18. If a single power source is employed, two three-position four-way electromagnetic valves 11, 12 with manual function connected in parallel (and if two power sources are employed, the on- and off-positions of the valve body is locked by handles 13, 14 of the three-position four-way electromagnetic valves with manual function) are used to determine whether the main valve body 33 is in the on-position, the off-position or any intermediate position. Two shuttle-type bi-directional adjusting valves 6, 7 (or other bi-directional adjusting valves) are disposed to provide main valve cylinder chambers 36, 35 with bi-directional differential flow adjustment, and achieve stepless adjustment of the on-position, off-position and any intermediate position of the main valve flap 24. The device is advantage in that the on-off speed is adjustable, and the flow rate of the main valve is adjustable.

The working mode of the present system is following:

a. the power is supplied from the pressure port 2 of the main pipe 1 of the present system, and the outer energy supply pump and a compressor 19 are closed; the valve is manually locked;

b. the power is supplied by the outer energy supply pump and the compressor 19, and the pressure port 2 of the present system is closed; the valve is manually locked;

c. the power is supplied intermittently by the pressure port 2 of the main pipe 1 of the system or by the outer energy supply pump 19, so to ensure stable pressure and backup. The two modes operate compatibly (this requires the mediums of the two having the same parameters).

Drive System

I. Passive Control Drive

1. Closing process: tapping pressure from the pressure port 2 of the main pipe 1→line 41→check valve 10→end b of the passive shuttle-type three-way diverter adjusting valve 8→closing power supply of the energy accumulator 18, (manually adjusting the three-way directional valve 8 for locking selected as a function of energy supply mode) fluid flowing through the line 44→end p of the three-position four-way electromagnetic valve 11, switching to p→b connection line 46→end a of the shuttle-type bi-directional adjusting valve 6→line 48→right chamber 36→moving the piston 26→piston rod 31→moving the valve flap 24 to close in a closing direction.

Refluxing in the left chamber 35→end b of the valve 7→connecting line 45→end a of the valve 11, switching to a→t connection→line 49, returned to return tank 5.

2. Opening process: tapping pressure from the pressure port 2 of the main pipe 1→line 41→valve 8→line 44→valve 11→switching to p→a connection→line 45→end a of the valve 7→line 47→left chamber 35→moving the piston 26→piston rod 31→moving the valve flap 24 to completely open in an opening direction.

Refluxing in the right chamber 36→line 48→valve 6→line 46→valve 12 (b-t connection)→line 49→return tank 5.

II. Peripheral Power Source Drive

1. Opening: pump 19→pressurizing the power source via the line 40→check valve 16→line 42→energy accumulator 18→check valve 17→line 43→end c of the valve 8→line 44→end p of the valve 12 (switching to p→a connection)→line 45 connecting with end a of the valve 7→line 47→left chamber 35→moving the piston 26→piston rod 3→moving the valve flap 24 to completely open in an opening direction.

Refluxing in the right chamber 36→line 48→valve 6→line 46→valve 11 (b-t connection)→line 49→return tank 5.

2. Closing: the pump, the line 40 of the compressor 19 pressurizing the power source→check valve 16→line 42→energy accumulator 18→check valve 17→end c of the valve 8→line 44→valve 11 switching to p-b connection→line 46→end a of the valve 6→line 48→chamber 36→moving the piston 26→piston rod 31→moving the valve flap 24 to completely close in a closing direction.

Refluxing in the left chamber 35→line 47→valve 7→line 45→valve 12 (a-t connection)→line 49→return tank 5.

III. Compatible Drive of the Passive Controlled Device and the Outer Power Source The handles 13, 14 of the three-position four-way electromagnetic valves 11, 12 with manual function are used to lock opening and closing position of the main valve body when the two power sources are both used to drive.

Figure 3:
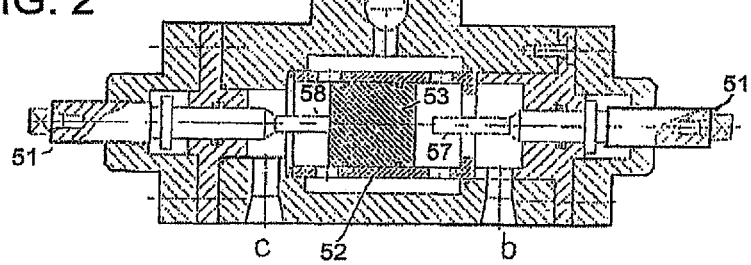
FIG. 3 is a schematic view showing the structure of the passive shuttle-type three-way diverter valve according to the present invention.

In the case that the two power sources are both used for driving, when one power source is selected, the screw 51 is manually adjusted to move the adjusters 57, 58 of the shuttle-type three-way diverter adjusting valve (see FIG. 3) integrally connected thereto to positive or negative limit positions, and to fix the shuttle core 53 to a state of unidirectional opening without reversing along with pressure difference, thereby achieving unidirectional selection and preventing oscillation and unstable current caused by bi-directional pressure fluctuation. FIG. 3 shows how to lock an energy supply mode:

The right screw 51 is rotated to force the shuttle 53 to the left limit position, so as to completely block the pressure inlet c, thus locking a state in which all the inlets of the system power source b are open by pushing force of the screw and back pressure.

The left screw 51 is rotated to force the shuttle 53 to the right limit position, so as to completely block the pressure inlet b, thus locking a state in which all the inlets of the outer power source c are open by pushing force of the screw and back pressure.

Embodiment 2

The bypasses of the lines 47, 48 and 41 are respectively provided with shuttle-type boost insulation valves 61, 60, 62.

The shuttle-type boost insulation valves are composed of a multi-piston cavity and a mono-piston cavity which are coaxial, a heat insulator being disposed between a multi-piston rod and a mono-piston rod for connection; a heat insulator is disposed between the multi-piston cavity and mono-piston cavity for connection and the two cavities are coaxial; more than two pistons are provided in the multi-piston cavity to enhance pressure boosting. A plurality of sealing and heat insulating means are provided to prevent leakage of high-temperature, hazardous and poisonous mediums.

The mono-piston cavity of the shuttle-type boost insulation valve must have a volume larger than the left or right chamber of the double acting cylinder 34, in order to ensure enough stroke of the main valve.

The double acting cylinder 34, the piston 25, the lines 47, 48, the mono-piston cavity of the valve 60, 61 and the electromagnetic valve c of the valve 60, 61 constitute a reciprocal sealed loop, in order to prevent high-temperature, hazardous and poisonous medium from affecting the drive control system, and to ensure stability and reliability and safe operation. The medium in the loop may be medium transported in the system or special high-temperature resistant medium.

The multi-piston rod 63 and the mono-piston rod 64 of the shuttle-type boost insulation valve are connected by a coupling flange 65, 66 and a heat insulation pad 67 therebetween. A connecting screw 68 is provided with a heat insulation gasket 69 and a heat insulation sleeve 70. The mono-piston cavity and the multi-piston cavity are connected by means of flanges 71, 72, wherein the heat insulation structure is identical with the foregoing one. The multi-piston cavity is provided with a seal 73 and a heat insulator 74 at the upper end thereof, each piston having an exhaust line and an input line. The seal 73 and the heat insulator 74 are arranged at a connection between the multi-piston cavity and the mono-piston cavity and the piston rods. The mono-piston cavity has a heat insulator 74 at the lower end thereof.

Connection of the three shuttle-type boost insulation valves 60, 61, 62:

Relationship between the valve 62 and the system:

The shuttle-type boost insulation valve 62 and three matched electromagnetic valves a, b and c which can be manually or electrically operated are connected in parallel between a water port 2 and the line 41; one end of the valve c is connected with the pressure port 2 and the other end is connected with the multi-piston cavity of the valve 62; one end of the valve b is connected with the line 41 and the other end is connected with the mono-piston cavity of the valve 62; one end of the valve a is connected with the pressure port 2 and the other end is connected with the line 41 and is in parallel connection with the valve 62.

The valve 62 is not necessary when the system pressure level is appropriate and stable, the temperature is constant, and the non-poisonous and non-hazardous medium is consistent with the drive system medium. The valve a is opened and the valves b and c are closed to establish a direct-connection mode between the pressure port 2 and the line 41;

When the system pressure level is inappropriate and unstable, the temperature is high and the poisonous and hazardous medium is not consistent with the drive medium, the valve 62 may be used. The valve a is closed and the valves b and c are opened to establish a connection mode between the pressure port 2 and the line 41 via the valve 62.

The relationship between the valve 60 and the system:

The shuttle-type boost insulation valve 62 and three matched electromagnetic valves a, b and c which can be manually or electrically operated are connected in parallel between a right chamber connecting line 48 of the piston 25 and point b of the valve 6; one end of the valve c is connected with the line 48 and the other end is connected with the mono-piston cavity of the valve 60; one end of the valve b is connected with point b of the valve 6 and the other end is connected with the multi-piston cavity of the valve 60; one end of the valve a is connected with point b of the valve 6 and the other end is connected with the line 48 and is in parallel connection with the valve 60.

The valve 60 is not necessary when the system pressure level is appropriate and stable, the temperature is constant, and the non-poisonous and non-hazardous medium is consistent with the drive system medium. The valve a is opened and the valves b and c are closed to form a direct-connection mode between the point b of the valve 6 and the line 48;

When the system pressure level is in appropriate and unstable, the temperature is high and the poisonous and hazardous medium is not consistent with the drive medium, the valve 60 may be used. The valve a is closed and the valves b and c are opened to form a connection mode between the point b of the valve 6 and the line 48 via the valve 60.

The relationship between the valve 61 and the system:

The shuttle-type boost insulation valve 61 and three matched electromagnetic valves a, b and c which can be manually or electrically operated are connected in parallel between a left chamber connecting line 47 of the piston 25 and a point b of the valve 7; one end of the valve c is connected with the connecting line 47 and the other end is connected with the mono-piston cavity of the valve 61; one end of the valve b is connected with the point b of the valve 7 and the other end is connected with the multi-piston cavity of the valve 61; one end of the valve a is connected with the point b of the valve 7 and the other end is connected with the line 47 and is in parallel connection with the valve 61.

The valve 61 is not necessary when the system pressure level is appropriate and stable, the temperature is constant, and the non-poisonous and non-hazardous medium is consistent with the drive system medium. The valve a is opened and the valves b and c are closed to form a direct-connection mode between the point b of the valve 7 and the line 47;

When the system level is inappropriate and unstable, the temperature is high and the poisonous and hazardous medium is not consistent with the drive medium, the valve 61 may be used. The valve a is closed and the valves b and c are opened to form a connection mode between the point b of the valve 7 and the line 47 via the valve 61.

Other structures are the same as in the embodiment 1.

I claim:

1. A driving and adjusting device of a passive shuttle-type shut-off valve comprising a valve body in which a left end of the valve body is connected with an upstream pipe, and a right end of the valve body is connected with a downstream pipe; in an inner chamber, a valve sleeve and a coaxial valve shaft are in axial sliding engagement with each other; the left end of the valve shaft is connected with a valve flap and the right end thereof is connected with a piston, the piston is in a double acting cylinder within the valve sleeve; a double acting cylinder cap is provided at the right end of the valve sleeve, and flow channels are disposed around the valve sleeve; a left side of the valve flap is in sealing engagement with a valve seat, and between a right side of the valve flap and the double acting cylinder there is disposed a spring; a left chamber of the double acting cylinder is connected with the first and second three-position four-way valves via a first line or a first shuttle-type boosting insulation valve connected in parallel with the first line, a first bi-directional adjusting valve, and a second line; a right chamber of the double acting cylinder is connected with ends of the first and second three-position four-way valves via a third line or a second shuttle-type boosting insulation valve connected in parallel with the third line, a second bi-directional adjusting valve and a fourth line; the first and second three-position four-way valves are connected with a three-way diverter adjusting valve via a fifth line; the first and second three-position four-way valves are connected to a return tank via a sixth line; the three-way diverter adjusting valve is connected with an energy accumulator via a seventh line and a first check valve; the three-way diverter adjusting valve is connected with a pressure port of the upstream pipe via a second check valve, an eighth line or a third shuttle-type boosting insulation valve connected in parallel therewith; the energy accumulator is connected with the return tank via a ninth line, a third check valve, a pump, and a tenth line; the energy accumulator is connected with a pressure relief groove via a pressure relief valve and an eleventh line.

2. The device according to claim 1, wherein the first and second three-position four-way valves are manually operated valves or electromagnetic valves; the first, second and third check valves are passive shuttle-type check valves; the three-way diverter adjusting valve is a passive shuttle-type three-way diverter adjusting valve; adjusting screws are disposed at opposite axial ends of a shuttle sleeve of the three-way diverter adjusting valve, the screws come into contact with either side of a shuttle core via an adjuster fixedly connected to a screw; an end port b and an end port c are in communication with a main channel, an end port a is in communication with a by-pass channel and is provided with a fourth check valve therein; a shuttle core blocks the end ports b and c respectively at limit positions; the first and second bi-directional adjusting valves are passive shuttle-type bi-directional adjusting valves.

3. The device according to claim 1, wherein the first and second three-position four-way valves are electromagnetic valves with handles.

4. The device according to claim 1, wherein a first, a second, and a third handled electromagnetic valve are arranged respectively in the first line, the third line and the eighth line; the first electromagnetic valve is connected with a first multi-piston cavity and a mono-piston piston cavity of the shuttle-type boosting insulation valve by means of the second and the third handled electromagnetic valves; a piston in the first multi-piston cavity and a piston in the mono-piston cavity are coaxial with each other, and heat insulating layers are disposed between the pistons and between the two cavities; a volume of the mono-piston cavity is greater than that of a left or a right chamber of the double acting cylinder.

5. The device according to claim 4, wherein the second handled electromagnetic valve is connected with the mono-piston cavity and the second check valve, and a fourth and a fifth handled electromagnetic valve is respectively connected with the first and second bi-directional adjusting valves and a second and a third multi-piston cavity.

* * * * *